United States Patent [19]
Armand

[11] 3,952,439
[45] Apr. 27, 1976

[54] ANIMAL TAG
[76] Inventor: Walter R. Armand, 1918 Newton St., Denver, Colo. 80204
[22] Filed: June 17, 1974
[21] Appl. No.: 479,915

[52] U.S. Cl. .................................................. 40/301
[51] Int. Cl.² ........................................... G09F 3/04
[58] Field of Search ..................... 40/300, 301, 302; 63/13, 12

[56] References Cited
UNITED STATES PATENTS

| | | | |
|---|---|---|---|
| 2,691,846 | 10/1954 | Fruhling | 63/12 X |
| 3,512,289 | 5/1970 | Hayes | 40/301 |
| 3,552,051 | 1/1971 | Ritchey | 40/301 |
| 3,605,310 | 9/1971 | Brown | 40/301 |
| 3,765,113 | 10/1973 | Magee | 40/300 |

FOREIGN PATENTS OR APPLICATIONS

| | | | |
|---|---|---|---|
| 907,214 | 6/1945 | France | 63/13 |

Primary Examiner—Louis G. Mancene
Assistant Examiner—John H. Wolff
Attorney, Agent, or Firm—C. B. Messenger

[57] ABSTRACT

An animal identification tag of thin sheet flexible material having an insert section of generally triangular shape that provides a forwardly disposed tool engaging hole. The insert section is joined by a narrowed neck portion to a body section, upon the face of which marking data may be entered. An insect disturbing fringe is provided on a free edge of said body, and the forward edges of said insert section are curved and of tapered thickness for cooperative interaction with a narrow slit or cut in the animal's skin to enfold the insert section of said tag about the shank of the application tool that provides the narrow cut. The tools have a sharpened arrow type point with a hook element disposed at a raised center rib of the tool. One tool embodiment has an arrow point and a backup and extractor piece mounted in scissors type opposed arrangement for improved operation.

6 Claims, 9 Drawing Figures

ANIMAL TAG

BACKGROUND OF THE INVENTION

In order to improve herd management conditions, it is desirable to provide some type of marking device so that separate animals of the herd may be individually identified. Since separate index markings may be required to indicate ownership, age, date of acquisition, strain and genealogy, a large type of tag might be required. Since it is further desirable to establish identification without direct close approach to the animal, a tag that can carry large symbols and markings is of special benefit. Several different types of animal tags have been developed and are now in expanding usage. Identification tags having a single structural component are presently favored over some prior two-component tags or tags that loop and interlock on themselves. Most all of the separate types of earlier identification tags have been designed for use with specific tag applicator tools, the use of which is necessary or at least beneficial to assure proper and most efficient application of the tags. The present tag is of further simplified construction having beneficial application and use features.

SUMMARY OF THE INVENTION

The present invention provides an animal ear tag formed of flexible sheet material and having a forward insert section joined by a narrowed neck portion to an enlarged body section having a lower or rearward fringed edge. The forward or introductory edges of the insert section are curved and of tapering thickness whereby such edges interact with a slit or slot cut in the animal's skin so that the insert end is folded down and about the shank of the application tool as the insert end is extended through the slot in the animal's skin. Once the insertion end has been passed through the slot, the insertion end flattens out to extend past the end edges of the slot, and the tool is withdrawn leaving the tag installed in the desired position. The interaction between the cut slit and the tapered edges of the insert section provides an enfolding or rolling action that previously required the use of additional tool components or extra hand manipulations. One application tool disclosed herein provides an arrow shaped cutting point having a hook disposed close to the cutting point for engagement with a hole in the insertion end of the tag. This cutting point and a backup and extractor piece are mounted on a scissors type of tool in opposed positions one with respect to the other. The backup piece supports the animal ear as it is cut by the arrow point, and it subsequently engages itself behind the enlarged rearward section of the insertion end so that the tag is freed from the engaging hook as the arrow cutting point is retracted. Separate applicator tool embodiments are shown in the accompanying drawings.

DESCRIPTION OF THE PREFERRED EMBODIMENTS

Figure 1:
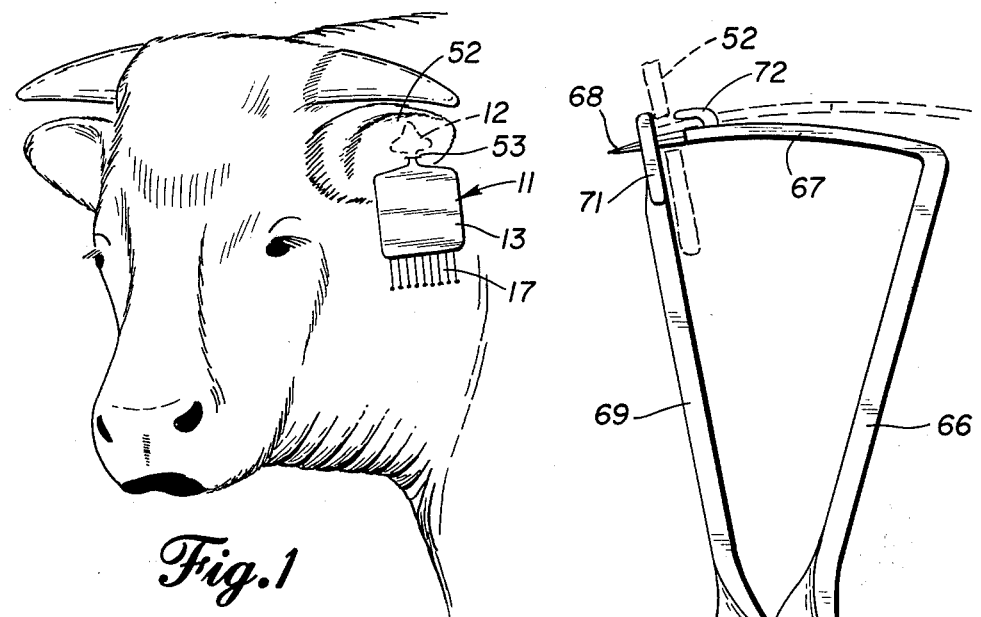
FIG. 1 is a perspective drawing showing an ear tag in place on an animal ear.
Figure 2:
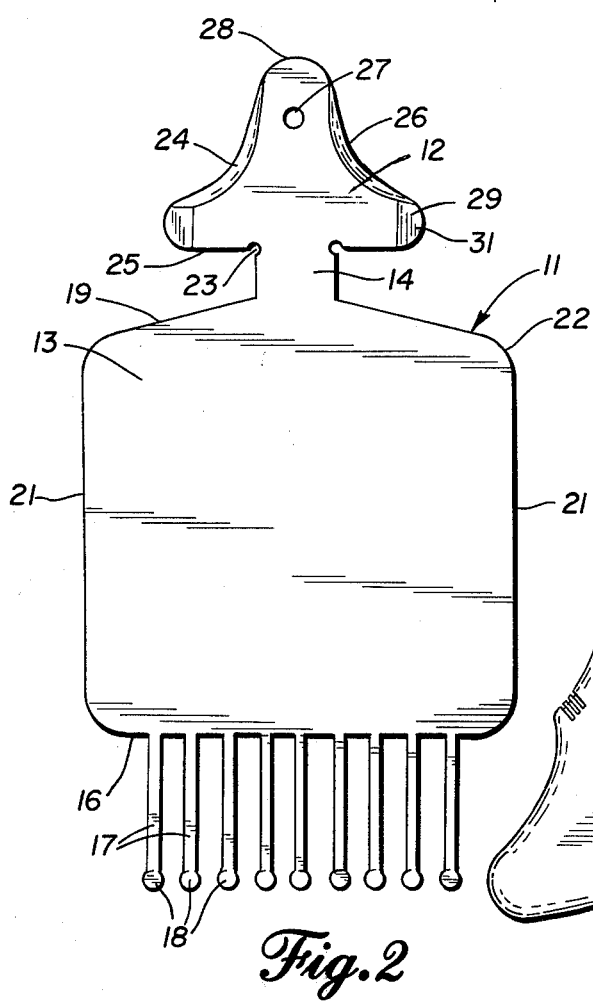
FIG. 2 is a top plan view of a preferred ear tag embodiment made in accordance with this invention.

A preferred embodiment of the applicant's ear tag is shown primarily in FIG. 2. An ear tag of such structure has been applied to the ear of the animal in FIG. 1. The ear tag 11 is itself formed of a relatively thin flexible sheet material to provide an insert section 12, an enlarged body section 13 and an interconnecting narrowed neck portion 14. A rearward or lower free edge 16 of the body 13 has a plurality of fringe tabs 17 which preferably have ball ends 18. The fringe tabs as shown in FIG. 1 hang downwardly when the ear tag is in place. The total tag is of such length and placement that the quite flexible fringe elements 17 can be used by the animal to flick flies or other insects away from the animal's face and eye. When the ear tag is used, index markings of large size (not shown) can be entered on the body section so that the index markings can be easily observed even at a considerable distance.

The tags 11 are preferably die stamped or molded from a flexible sheet material that will withstand substantial weathering over a long continued period of use and that will provide a surface and texture that is receptive of highly visible and permanent marking inks. Preferred embodiments of the invention have been made of urethane materials having a mold sheet thickness of approximately 1/16th of an inch with other dimensions thereof corresponding to the sizes illustrated in FIG. 2, which is a full scale representation of a beneficial embodiment of the invention in the original drawings. The actual construction for the tag components provides a body 13 that is of near equal length and width of two and three-quarters inches. The slanted shoulders 19, side edges 21 and the bottom edge 16 are all interconnected by rounded corners, such as the corner 22. The narrowed neck portion 14 is approximately ½ inch wide. The insert end has a base length along the edge 25 of approximately 1¾ inches, and the fillet radius cuts 23 interconnect the insert end 12 and neck portion 14 in a manner that will reduce the effect of stress concentrations. The fillet radius cuts 23 further contribute to the increased flexibility for the insert end 12 and make it easier for this end to be enfolded about the applicator tools. The forwardly disposed introductory edges 24 for the insert end 12 are curved as indicated and of tapered section away from the curved limits as shown at 26. An engaging hole 27 is provided adjacent the round tip 28 for the insertion end 12.

When the tag is to be used, a slit or slot is cut in the ear of the animal with the slot 53 being of width corresponding to the width of the narrowed neck portion 14. If the neck portion is ½ inch in width, the width of the cut slot might be in the range of from ½ inch to 11/16ths of an inch. If the size of the cut is closely controlled, the terminal ends 54 and 56 of the cut slot or slit 53 will interact with the tapered curved surfaces 26 to cause enfolding and rolling of the insertion end 12 as it passes through the slot in the animal skin. The initial enfolding and rolling action provided by the tapered curved surfaces 26 is continued by the interconnecting tapered surfaces 29 at the base tips 31 of the insertion end 12. The enfolding and rolling result is, of course, necessary in order to pass the insertion end 12 through the narrow skin slot so that the tag will be emplaced as, in general, shown in FIG. 1. The direction for insertion with respect to the inside and outside of the animal ear is not of particular importance so long as the side of the tag bearing the most important index markings is normally exposed for convenient viewing.

Figure 6:
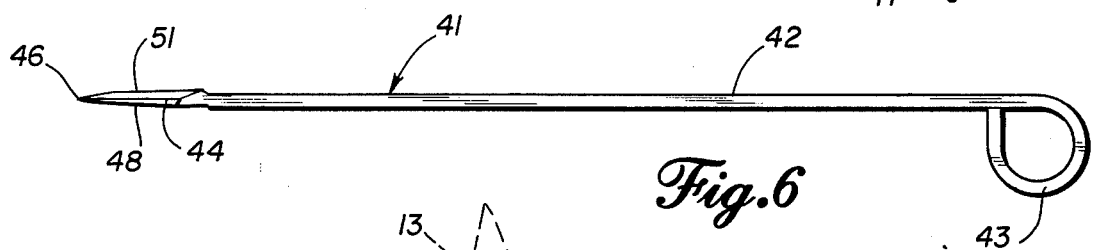
FIG. 6 is a side elevation of an alternate applicator tool embodiment.
Figure 7:
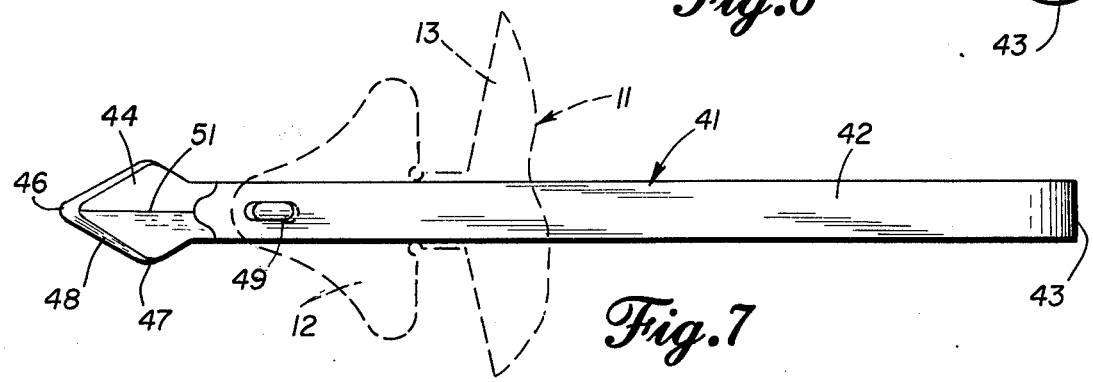
FIG. 7 is a top plan view of the tool shown in FIG. 6.
Figure 8:
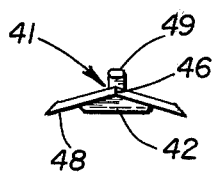
FIG. 8 is an end view of the arrow point only of the tool shown in FIGS. 6 and 7.
Figure 9:
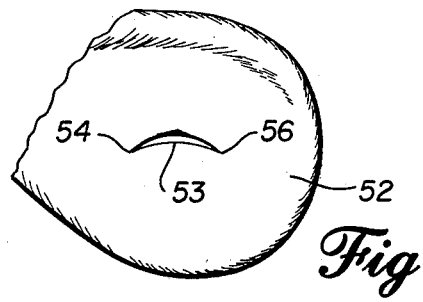
FIG. 9 is an illustration of the cut slot provided in an animal ear.

A simpler type of applicator tool is shown in FIGS. 6–8. The hand manipulated tool 41 shown in these FIGS. includes a shank component 42, a curled end 43 that provides with the shank 42 a convenient handle and pushing surface. The cutting end of the tool 41 essentially provides an arrow point 44 having an entrance point 46 and laterally extending side flanges 47. The body of the arrow point is tapered away from the cutting edges 48 illustrated to provide sharp efficient cutting of the required slot in the animal's skin. A hook 49 is punched from the body of the shank 42 and is adapted for engagement with the engaging hole 27 of the tag 11. As shown in FIG. 8, arrow point 44 has a raised rib 51, and the cutting edges 48 are at a lower elevation than said raised rib. This slightly dished or concave shape provides a more efficient slit or skin slot that is itself of slightly curved configuration in the animal ear 52, as shown by the cut slot 53 in FIG. 9. The limiting ends 54 and 56 of the cut slot 53 and the curved section thereof beneficially cooperate with the curved and tapered edges 26 of the insert tab section 12 to roll and enfold this insert end as it passes through the skin slot 53. In order to derive the arrow cutting point 44 illustrated, the material of the shank 42 is stamped and, accordingly, thinned and widened to provide the ridged shape shown. The tapered cutting edges can themselves be provided by such stamping operation, though some sharpening may still be advisable.

Figure 3:
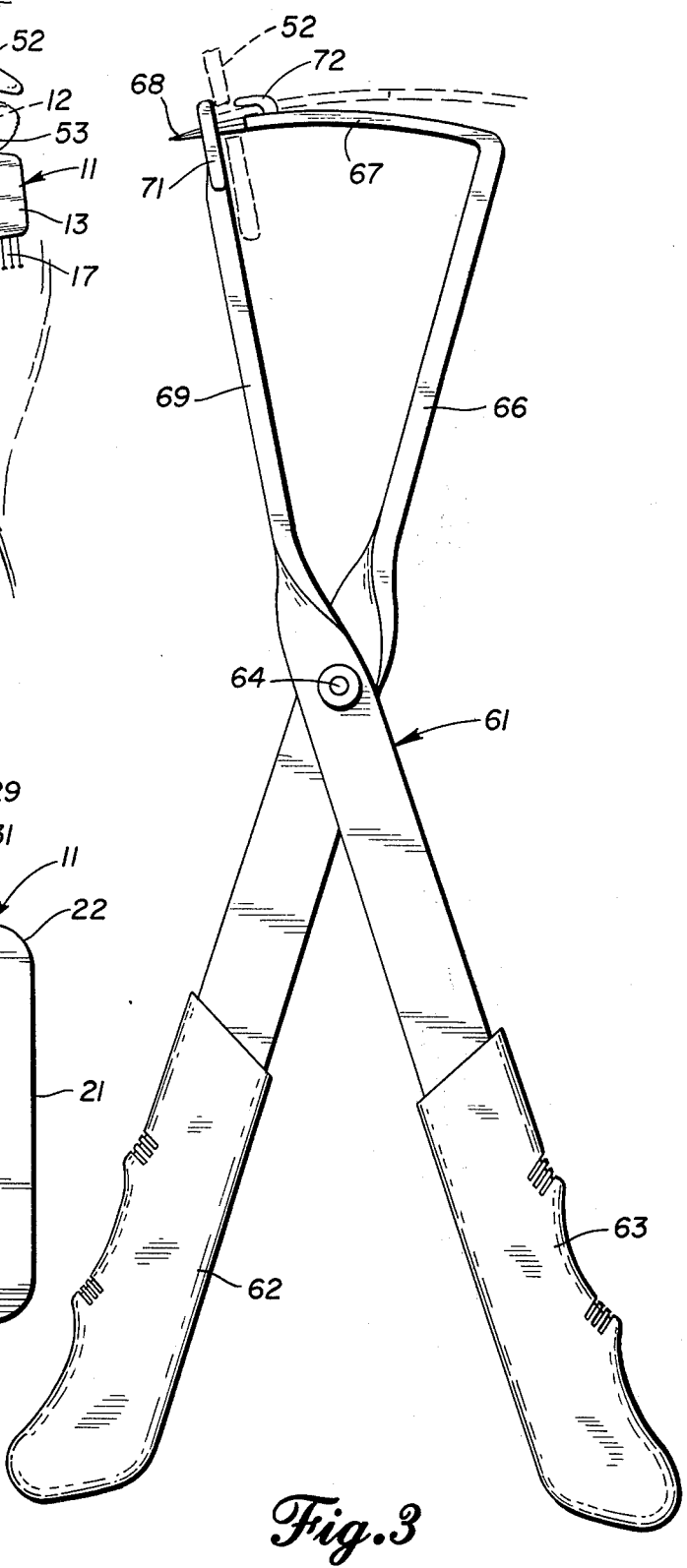
FIG. 3 is a side elevation of a preferred applicator tool indicating use with said ear tag.
Figure 4:
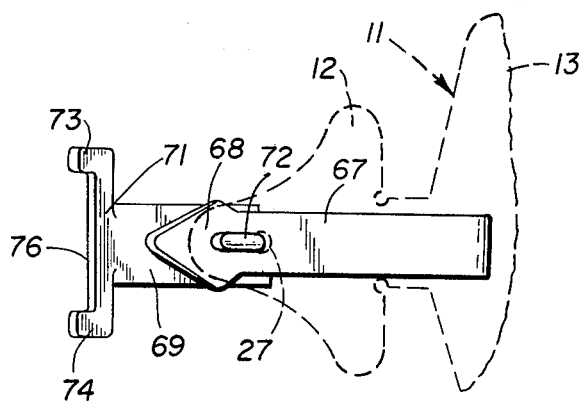
FIG. 4 is a partial top view of the applicator tool embodied in FIG. 3.
Figure 5:
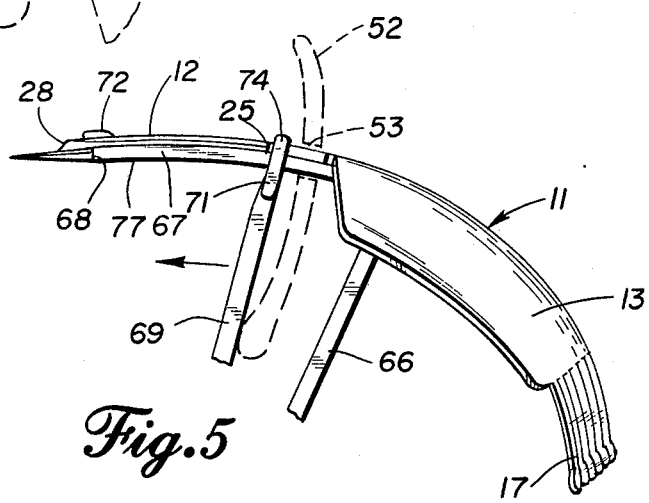
FIG. 5 is a side elevation showing a portion of the applicator tool in alternate position as the tag is placed.

An alternate form of applicator tool 61 is shown in FIGS. 3, 4 and 5. This beneficial tool 61 is of scissors type having handles 62 and 63 joined by a pivot 64. The material of the handles is twisted past the pivot to a position oriented approximately 90° to the plane of the handle components 62 and 63. An extension 66 of handle 62 provides support for a cutting arm 67 that includes an arrow shaped cutting point 68, while the extension 69 for handle 63 provides support for a backup and extractor component 71. The actual shape, purpose and use of the cutter component 67 and its arrow point 68 are similar in nature and operation to the arrow point 44 of the previous tool embodiment except that engaging hook 72 that passes through the engaging opening 27 for the insertion end 12 of tag 11 is positioned more closely adjacent to the arrow cutting point 68 in this embodiment. The backup and extractor component mounted on the extension arm 69 is essentially of bifurcated or forked construction providing separate tines 73 and 74 that are separated apart a distance greater than the width of the cutting point 68. As indicated in FIGS. 3 and 5, cutting point 68 passes the tines 73 and 74, and, in fact, end surface 76 of the backup piece 71 closely reciprocates past the underneath side 77 of the cutting arm 67. Cutting point 68 and backup piece 71 work in combination one with the other when an ear slot 53 is being cut as the tag 11 is placed and further when the tool 61 is being removed. The initial cutting operation is shown in FIG. 3. At this time the animal ear 52 is supported by the backup piece 71 as the cutting point 68 punctures its way therethrough to provide the cut slot 53. The spaced tines 73 and 74 continue to provide resistance and, accordingly, assist the enfolding action that results from the cooperative interaction of cut slot 53 and the tapered and curved surfaces 26–24 and 29 of tag 11. When the handles 62 and 63 are fully brought together, the insertion end 12 of the tag 11 will have passed completely through the ear slot 53. The tines 73–74 will still be behind the ear 52, as shown in FIG. 5, but they also move into a position behind the base edge 25 of the insertion end 12. Subsequent expansion of the scissors mount by moving the handles 62 and 63 away one from the other then causes the tines 73 and 74 to push in a reverse direction against the base edge 25 of insertion section 12 and, accordingly, to disengage the hook 72 from the tag engaging opening 27. When the cutting point 68 and the backup piece 71 are moved further to a mutually non-interfering position, the tool 61 may be removed from the animal ear, and the identification tag 11 will be in its proper engaged relationship. A single-handed tag applying operation is possible when applicator tool 61 is used. The tool operator's other hand can be used for animal control or other purposes.

I claim:

1. An animal identification tag for attachment in a cut slit passing through an ear or other skin area of an animal comprising insert and body sections for forward and rearward disposition, respectively, and an interconnecting neck portion therebetween, said identification tag being formed unitarily of resilient sheet material having generally planar top and bottom faces, said body section being of larger size than said insert section and adapted to receive identification markings on the opposed top and bottom faces thereof, said neck portion extending forwardly from said body section and being of width corresponding to the width of the cut slit through which it will extend and of substantially reduced width with respect to said body section, angularly disposed introductory side edges for said insert section diverging outwardly from a forward entrance end, a terminal or base edge for said insert section connected to said narrower neck portion and extending outwardly therefrom to intersect said introductory side edges, and an angled surface intersecting a planar face of said insert section at said introductory side edges to provide a tapered section that reduces the thickness of said sheet material at positions disposed apart a distance greater than the width of said neck portion whereby the insert section of said tag interacts with a tag receiving slit cut in an animal's skin to cooperatively enfold said insert section as it is moved in a forward direction through said cut slit.

2. The identification tag as set forth in claim 1 and further comprising tapered surfaces providing base tip segments at said introductory side and base edge intersections with the tip segments at opposite sides of said insert section being apart a distance less than the width of said body section.

3. The identification tag as set forth in claim 2 wherein the tapered surfaces of said tip segments and the angled surface providing the tapered section at said introductory side edges are contiguous whereby the insert section enfolding action is continued as the tag is applied.

4. The identification tag as set forth in claim 1 and further comprising fillet radius cuts at the intersections of said neck portion and said base edge to relieve and reduce the cross-sectional width of said neck portion thereat whereby the flexibility of said insert section is increased and the desired enfolding action is improved.

5. The identification tag as set forth in claim 1 wherein the terminal limit of said introductory side edges is curved whereby said enfolding action is improved.

6. The identification tag as set forth in claim 1 for use as an ear tag and further comprising a plurality of fringe tabs extending rearwardly of said body section.

* * * * *